Feb. 26, 1963 R. GREENAWAY 3,078,762

COMBINATION SOUND REPRODUCING AND SLIDE PROJECTING APPARATUS

Filed July 6, 1960 3 Sheets-Sheet 1

INVENTOR.
RICHARD GREENAWAY
BY Lynn H Latta
ATTORNEY

COMBINATION SOUND REPRODUCING AND SLIDE PROJECTING APPARATUS

Filed July 6, 1960 3 Sheets-Sheet 2

INVENTOR.
RICHARD GREENAWAY
BY Lynn H. Latta
ATTORNEY

Feb. 26, 1963 R. GREENAWAY 3,078,762

COMBINATION SOUND REPRODUCING AND SLIDE PROJECTING APPARATUS

Filed July 6, 1960 3 Sheets-Sheet 3

INVENTOR.
RICHARD GREENAWAY
BY Lynn H. Latta
ATTORNEY

United States Patent Office 3,078,762

Patented Feb. 26, 1963

3,078,762

COMBINATION SOUND REPRODUCING AND SLIDE PROJECTING APPARATUS

Richard Greenaway, Los Angeles, Calif., assignor to Lyle B. Weber, Los Angeles, Calif.

Filed July 6, 1960, Ser. No. 41,125

13 Claims. (Cl. 88—27)

This invention relates to combined sound reproduction and slide projector apparatus and has as its general object to provide an improved portable unit apparatus of a type wherein sound is reproduced from a rotatable disc type phonograph record and picture projection is controlled by the rotation of the record and, specifically, the position of the stylus following the record groove, and is thereby synchronized with respective sections of the record which are related to the respective pictures.

Apparatus of this type was proposed many years ago, but, due to shortcomings in the apparatus proposed, has never been satisfactorily utilized in actual practice. The present invention provides an improved combination of structure and operation in that general type of apparatus, whereby for the first time the broad concept disclosed therein can be satisfactorily utilized.

The invention is especially useful as embodied in a compact portable sound reproducing and slide projecting unit for combined visual and audible teaching procedures in public schools, adult education classes, educational lectures, etc.

A particular object is to provide such a unit portable apparatus which, when set up for operation, embodies a screen of relatively small proportions (in the range of under two feet square) directly attached to a base housing thereof, with contained operating mechanism and with a turntable and projector disposed thereon. The invention provides a screen which is demountable and an upper housing unit comprising a plurality of side, back and top panels which likewise are demountable and adapted to be erected over the turntable and projector mechanism to establish a light-excluding casing in back of the screen so that the picture, as projected on the back side of the screen by the projector unit, will appear with maximum sharpness of detail and contrast. These upper housing panels and screen are foldable into close association with the base housing structure to provide a compact portable package for transportation purposes.

From the foregoing it will be apparent that the invention aims to provide an apparatus wherein the projector unit will project its picture above the turntable area onto the screen while is erected in a vertical position at one side of the turntable area. More specifically, in this connection, it is the object of the invention to provide a compact portable arrangement wherein, in the apparatus as erected for use, the screen and projector are disposed at one side of the turntable area, a mirror is disposed at the opposite side of the turntable area, and the picture is projected in a cone shaped beam which crosses above the turntable and tone arm of the phonograph mechanism and is reflected by the mirror back upon the screen.

For maximum compactness of the erected structure and avoidance of distortion of the picture (by maintaining the major axis of the conical beam as nearly perpendicular to the screen as possible) the invention aims to position the lower extremity of the screen only slightly above the turntable level (sufficiently so that the beam will clear the turntable and tone arm) and the cone of light rays is accordingly projected with its axis inclined upwardly at a small angle and with its lowermost rays extending approximately horizontally along a path just clearing the tone arm. In the attainment of this result, the invention provides a novel and improved arrangement of projector disposed adjacent the periphery of the turntable and somewhat above its level, in a position to direct its beam diametrically across the turntable area, together with a novel and improved transparency strip, and means for supporting the same in an arcuate position directly above and approximately registering with the periphery of the turntable, such transparency strip having a frusto-conical contour such that the individual transparencies are tilted upwardly and outwardly with respect to the turntable periphery and in positions normal to the major axis of the picture-projection beam. Thus the image resolved by the passage of the beam through the transparencies is characterized by maximum freedom from distortion.

A still further object of the invention is to provide, in such an apparatus, an improved transparency strip having the characteristics outlined above, and in addition, having means for demountably attaching the same to its supporting member so that transparency bands can be quickly exchanged.

Another object is to provide an improved combination and arrangement of parts including a turntable, a transparency strip support pivotally mounted on the turntable and frictionally driven thereby and including a toothed arcuate stop bar engageable with a stop pin associated with the reproducer stylus to successively position the transparency strip to dispose the respective transparencies in front of the projector lens in accordance with the position of radially inward travel of the stylus as it follows the record; said means including improved follower means for engaging and responding to the position of the stylus without interference with a smooth following of the record groove by the stylus. In this aspect, the invention solves a difficult problem that I have encountered in attempting to utilize the stylus movement to control the positioning of the transparency strip, in that in its transition movement from one notch to a succeeding notch in the keeper bar, the stylus tends to develop a camming effect which reacts it to move it radially inwardly toward the center of the record, forcing it out of the record groove and causing it to "jump" one or more turns of the same.

A further object is to provide improved means for steadying the slide holder carriage so as to avoid flutter of the image on the screen during projection. In the simpler form, the invention utilizes roller bearing means engaging the carriage rim. In an improved form, automatically releasable electromagnetic means are utilized for steadying the rim carriage.

Other objects and advantages will become apparent in the ensuing specifications and appended drawing in which.

Figure 2A:
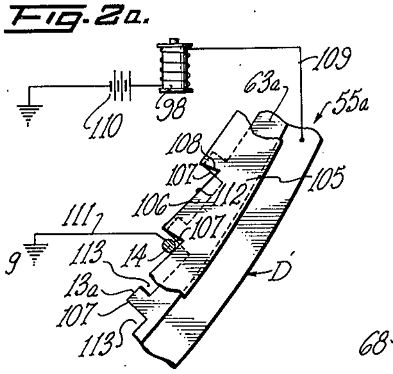
FIG. 2 is a fragmentary plan view of a preferred form of the slide holder carriage thereof.
Figure 2:
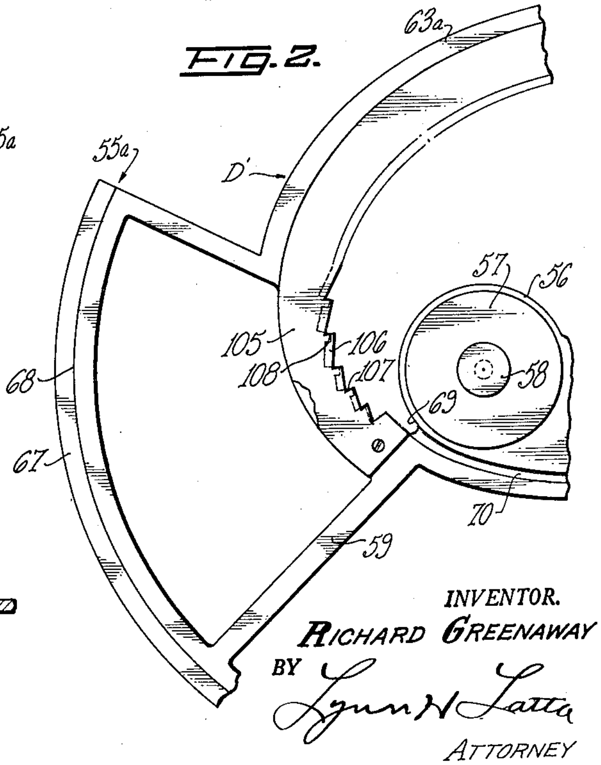
Figure 2B:
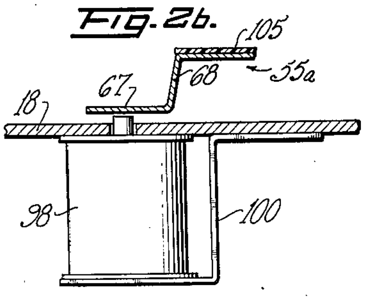
Figure 4:
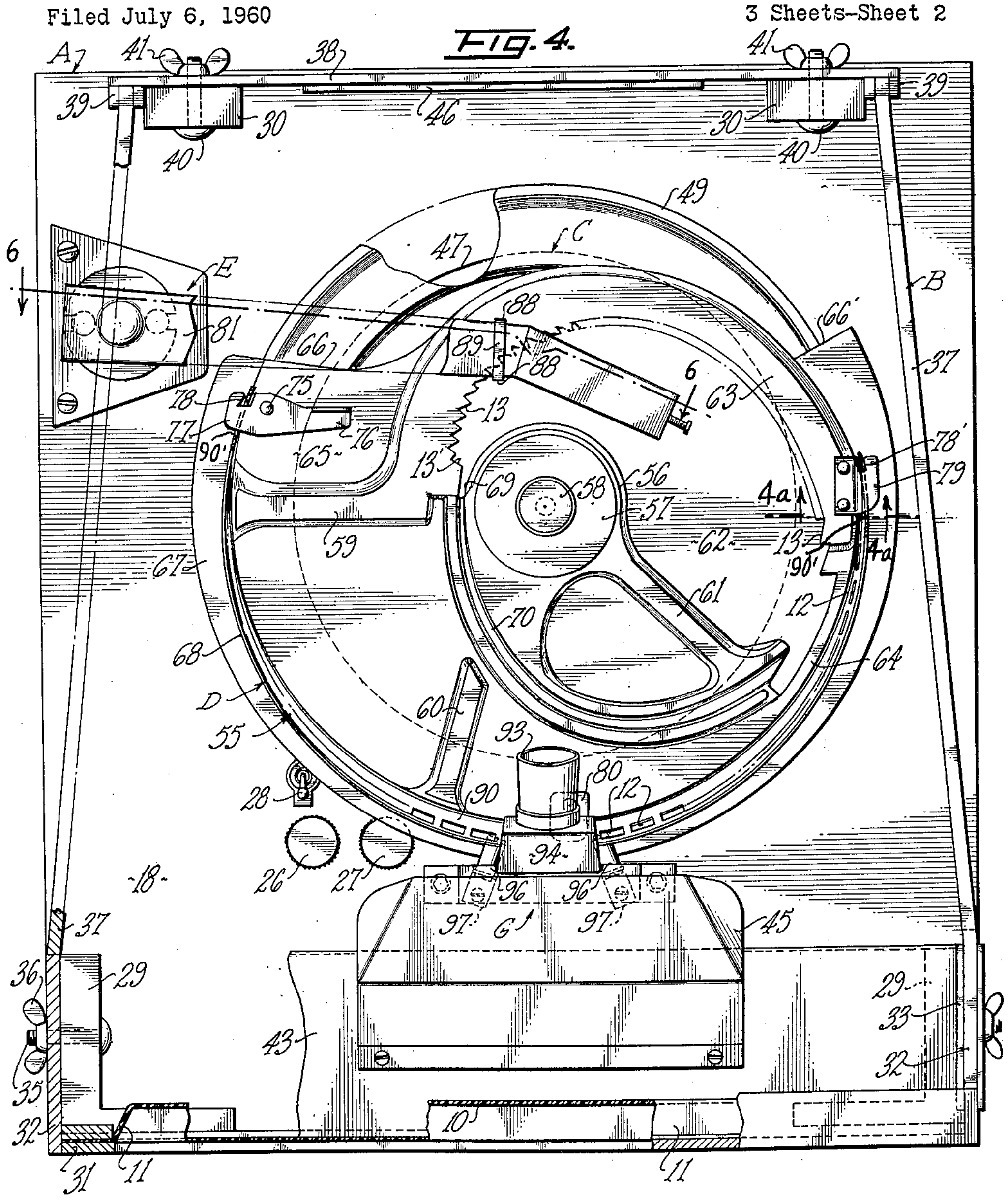
Figure 3:
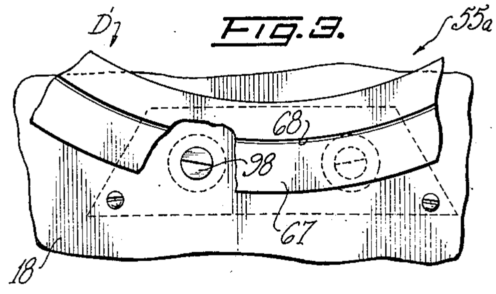
Figure 4A:
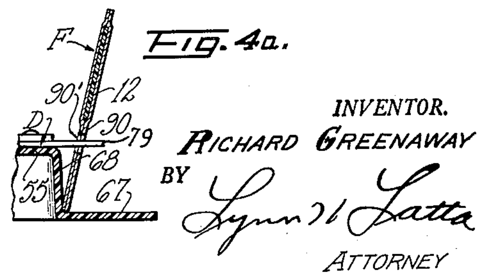
Figures 5, 5A, 6, 7:
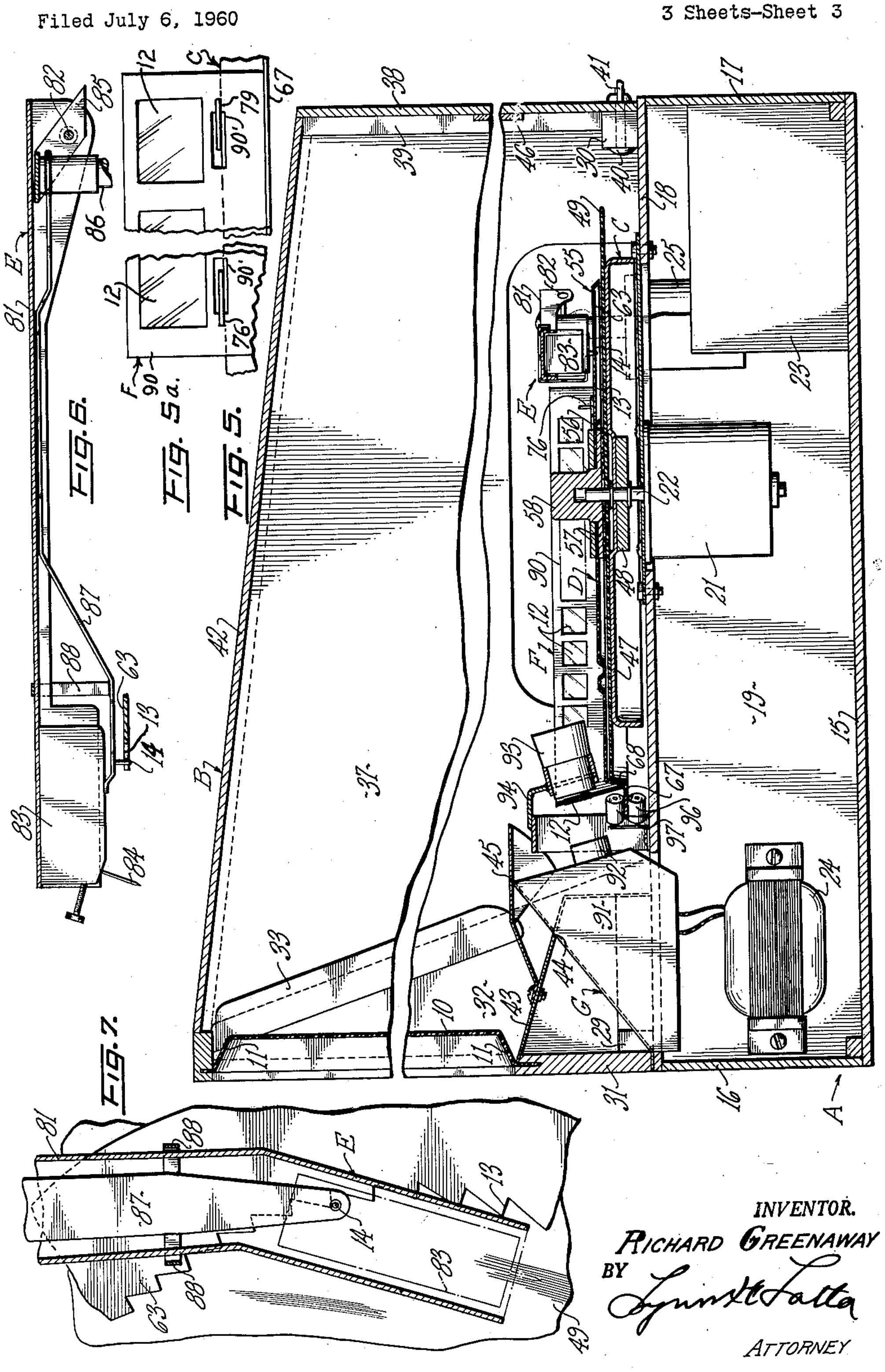

FIG. 2*a* is a fragmentary schematic view of the control mechanism;

FIG. 2*b* is a fragmentary sectional view of the magnetic hold-down carriage stabilizing unit for steadying the slide holder strip during picture projection taken on line 2*b*—2*b* of FIG. 4;

FIG. 3 is a fragmentary view of the magnetic stabilizer;

FIG. 4 is a plan view of a modified form of the invention with the cover panel removed;

FIG. 4*a* is a fragmentary sectional view of the transparency band;

FIG. 5 is a longitudinal sectional view of the erected apparatus;

FIG. 5*a* is a fragmentary elevational view of the end portions of the transparency strip;

FIG. 6 is a vertical longitudinal sectional view of the tone arm and the stop-follower means, taken on line 6—6 of FIG. 4; and FIG. 7 is a fragmentary sectional view of a horizontal plane, of the tone arm and follower assembly, at the stylus end of the tone arm.

GENERAL DESCRIPTION

Referring now to the drawings in detail, I have shown therein, as an example of one form in which the invention may be embodied, a combined slide projector and sound reproducer apparatus comprising, in general, a base unit A including a shallow rectangular housing containing a number of conventional electrical and drive units such as an electrical turntable drive, a suitable amplifier unit, a tone arm actuator unit, a speaker unit, conventional volume and tone control units, and electrical connections for the projector. The apparatus further includes a turntable assembly C, an indexing slide holder carriage D, and a tone arm assembly E having associated follower means cooperating with the indexing carriage D. The apparatus further includes a transparency strip F embodying a plurality of picture transparencies 12 adapted to be successively positioned in front of a light source provided by a projector G for projecting successive pictures upon screen 10; and a demountable cover assembly B for enclosing the space above the turntable, said assembly B including a projection screen 10 which is positioned just behind projector G when the apparatus is erected for use.

The indexing carriage D is supported upon the record carried by turntable C and receives light frictional drive therefrom. It includes an indexing stop bar having a plurality of stop teeth 13 adapted to be successively engaged to restrain the carriage D from the pivoting movement for which it is biased by the frictional drive. The tone arm assembly E embodies follower mechanism including a follower pin 14 (FIG. 6) which successively engages the stop teeth 13 to effect a series of stages of holding movement corresponding to respective sections of the record groove as engaged by the tone arm stylus. The inward movement of the tone arm assembly E toward the center of the record as the stylus follows the record groove effects the sequential release of the follower pin 14 from the stop teeth 13 in succession. As one tooth 13 is released, the light frictional drive of the record against the carriage D will shift the latter through a small increment of pivotal movement until the stop pin 14 engages the succeeding tooth 13 to again arrest the indexing carriage D in a fixed position in which a picture will be projected until the corresponding portion of the record groove has been traversed by the stylus.

The foregoing general description of the invention and its operation is given to facilitate an understanding of the details of construction and operation which will now be described.

DETAILED DESCRIPTION

*Base assembly.*—The base assembly A (FIG. 1) includes a shallow rectangular housing comprising a bottom panel 15, front and rear panels 16 and 17, and a top panel 18 secured together in open-sided box form, and with vertical partitions 19 extending parallel to and spaced inwardly from its respective open sides, to define, at both sides of the base, compartments in which are received elongated rectangular speaker units 20 (for stereophonic reproduction where a stereo record is used).

Figure 1:
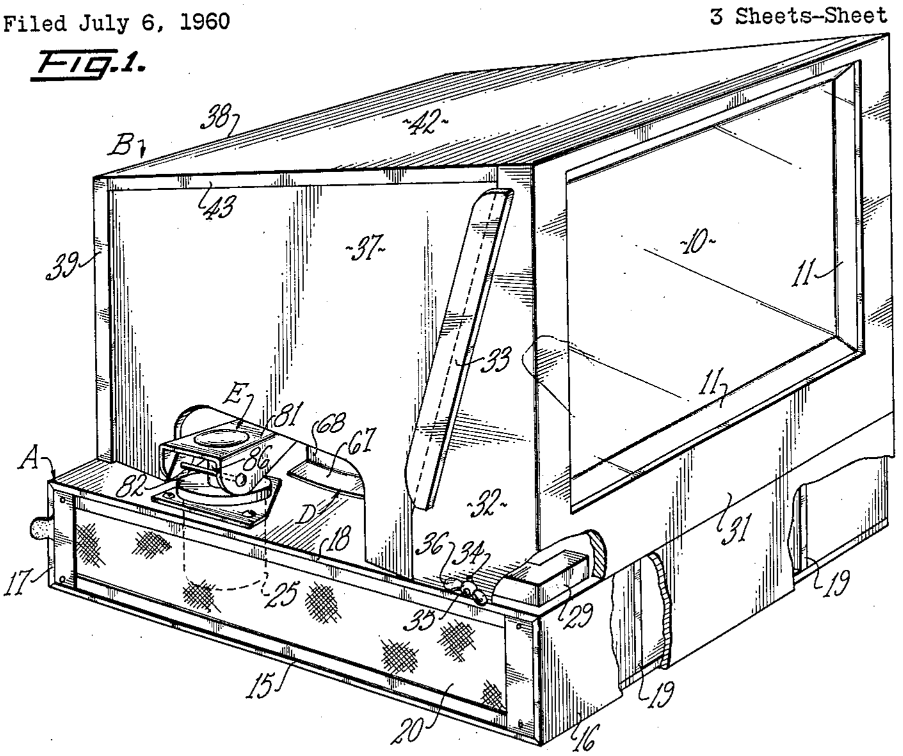
FIG. 1 is a perspective view of a combined sound reproducer and slide projector embodying the invention, with its demountable superstructure erected for operation thereof.

Within this base housing are mounted the various operating and control units of the apparatus, including an electrical motor with reduction drive, indicated schematically at 21 in FIG. 5 and driving a turntable drive shaft 22; a suitable audio amplifier unit or units 23 (likewise shown schematically) for the sound reproducer apparatus; a suitable step-down transformer 24 for converting the standard 110 volt service current into 7½ volt current for energizing the projector lamp; an automatic tone arm actuator unit which is indicated schematically at 25 in FIG. 1; and other necessary parts, including electrical controls for volume, tone, etc. and for the projector, mounted on the underside of the top panel 18 and including actuator knobs 26 and 27 and a toggle switch 28 above the panel 18, etc.

At the two forward corners of the base casing, secured to the upper surface of panel 18, are locating blocks 29 against which the forward portion of the cover structure D is adapted to be positioned and secured.

Along the rear margin of top panel 18, inset inwardly from its corners, are a pair of aligned abutment blocks 30.

UPPER HOUSING ASSEMBLY

The upper housing assembly B comprises a front member consisting in a screen frame 31 in which the screen 10 is mounted. A pair of side wings 32 project rearwardly from the side extremities of screen frame 31, and have a pair of integral retainer channels 33 (FIG. 4) extending along their rear margins. At their lower ends, wings 32 are provided with downwardly opening slot-like notches 34 to receive threaded studs 35 secured in and projecting laterally from the corner blocks 29. The corner blocks 29 have their outer vertical faces inset inwardly from the margins of the base casing to receive the thickness of frame 31 and wings 32 with the outer faces thereof flush with the margins of the base casing. Thumb nuts 36 are attachable to studs 35 to clamp the wings 32 tightly against the corner blocks 29 to secure the forward section of the upper housing structure tightly to the base housing.

The upper housing assembly B further includes a pair of side panels 37 the forward margins of which are contoured to mate with the rear margins of wings 32 and are receivable in the retainer channels 33, as shown in FIG. 4. A rear panel 38 (FIG. 4) has along its side margins, integral, forwardly projecting retainer channels 39 in which the rear margins of side panel 37 are received. In the lower margin of back panel 38 are a pair of notches (not shown) similar to the notches 34 adapted to receive the rearwardly projecting threaded ends of studs 40 mounted in abutment blocks 30. Wing nuts 41 are provided to be threaded onto the threaded rear ends of studs 40 to clamp the rear panel against the abutment blocks 30.

A top panel 42 has downwardly projecting side marginal retainer lips 43 receivable over the upper margins of side panels 37 to position the top panel 42 laterally, with its forward and rear margins abutting against the upper ends of the forward frame member 31 and the rear panel 38 respectively.

When the apparatus is to be transported, the screen frame 31, the side panels 37, rear panel 38 and top panel 42 are detached from the base housing by loosening thumb nuts 36 and 41 and are laid horizontally upon the turntable C and tone arm parts. A cover (not shown) is then placed over these parts and latched to the base casing by suitable trunk hasps or other conventional latches (not shown), and the closed apparatus then becomes a carrying case which can be carried by a suitable handle (not shown) attached to the rear panel 17 of the base casing, the speaker units 20 being frictionally retained in their respective compartments.

To the rear side of screen frame member 31, along the lower margin of screen 10, is secured a false bottom 43 of inverted L-section, bridging transversely between the lower portions of wings 32 and secured thereto at its ends. False bottom 43 is cut away at its central rear area to provide a notch 44 which receives projector G.

On back panel 38 is mounted a mirror 46, in a position to receive the image-bearing light beam projected by projector G, and to reflect it back upon screen 10.

The screen 10 is of translucent plastic sheet material having an outwardly offset marginal portion 11 laminated into the frame structure 31 as shown in FIG. 4, the screen 10 thus being recessed inwardly from the outward face of frame 31 so as to be shaded from overhead and lateral lighting within the room in which it is used.

A light shielding hood 45 is secured to the false bottom member 43 and projects forwardly over the notch 44.

*Turntable unit C.*—Turntable unit C is a standard construction, comprising a turntable disc 47 having a hub 48 securely mounted upon shaft 22 and driven thereby, and adapted to support a record 49 on its upper surface, with the shaft 22 projecting upwardly through a central aperture in the record in the standard manner.

*Transparency strip carriage—FIG. 4.*—All features of carriage D in both of its forms (except the stabilizing unit of the preferred form which is described hereinafter) are shown in FIG. 4. Carriage D comprises a carrier body 55 of thin disc form, of stamped and formed sheet material that is substantially rigid yet tough and shock resistant, hard and long wearing. A resin of the vinyl class, highly resistant to abrasion, may be satisfactorily employed. The vinyl sheet plastic material has sufficient flexibility and toughness for long life and also to absorb the shock of the follower pin dropping from one tooth to the next. The body 55 includes a circular central portion 56 which is clamped between opposed flanges 57 of a hub 58 which has in its under side a central socket to receive the upper end of turntable shaft 22 for rotatably centering the carrier on the turntable. The underneath flange 57 is adapted to seat upon the central area of the sound record 48 to provide solid support for the carrier D, and to transmit light frictional drive from the center of the record to the carrier. The carrier does not contact the grooved record surface of the record 49.

For approximately 180° of its circumference, carrier body 55 is substantially imperforate, but is preferably provided with embossed reinforcing ribs 59, 69, 61 of radial spoke form. Beyond the rib 61, the carrier body 55 is cut away to provide a generally spiral opening 62 which is bounded on its outer side by the teeth 13, formed integrally along the inward margin of a stop bar 63 extending spirally inwardly from a circularly arcuate rim segment 64 of body 55 to the inward extremity of rib 59, the inward terminal portion thereof being merged with and embossed above a web portion 65 of body 55 which projects beyond rib 59 to a radial shoulder 66 where the periphery of the body 55 is offset inwardly to the periphery of stop bar 63. Around approximately two thirds of its circumference, body 55 has an integral circular rim flange 67 which begins at the radial shoulder 66 and terminates at a radial shoulder 66′ located intermediate the ends of stop bar 63. Rim flange 67 is offset downwardly from the plane of body 55 and is integrally joined thereto by a rim shoulder 68 (FIG. 5).

Teeth 13 are progressively closer to the hub 58, beginning with the end tooth adjoining rim segment 64 and ending with a tooth adjacent the inward extremity of rib 59, consisting in an offset shoulder 13′. The increments of successive inward projection of teeth 13 are substantially equal, to correspond to substantially equal radial width of successive grooved sections of the record surface on which respective sections of a lecture or other audible production are recorded. Circumferentially, the teeth 13 subtend equal angles at the hub axis, corresponding to equal spacing of picture transparencies 12 in the strip F. Correspondingly, the teeth 13 are of successively shorter circumferential length as they approach the rotational axis.

From the shoulder 13′, a narrow slot 69 extends away from the terminal series of teeth, tangent to the periphery of the central body portion 56. From the end of slot 69, an embossed shallow guide groove 70 in body 55 extends spirally outwardly and terminates in a recess 71 which is defined between the outer end of rib 61 and rim segment 64.

Attached to the flat horizontal web portion 65 of the body 55 by a pivot 75, is a latch lever 76 having an outer end portion 77 provided with a retainer notch 78, for one end of the transparency band F. Secured to the stop bar 63 on the opposite side of the carrier unit D is an anchor hook 79 having a notch 78′ to receive the other end of band F. Latch lever 76 and hook 79 project through slots in the ends of band F, as described hereinafter. Notches 78 and 78′ are disposed immediately outwardly of carriage rim shoulder 68, which provides support for the band F as described more fully in the next section hereof. A flat finger 80 secured to body 55, engages in a slot in the middle portion of strip F to hold it down against flange 67.

*Tone arm assembly E.*—Tone arm assembly E may be of conventional construction, of a type comprising a stamped sheet metal arm 81 of inverted channel section having a rear end portion mounted on a horizontal pivot 82 for elevation of its forward end in which is mounted a conventional pickup unit 83 having a record-following stylus 84, the pivot 82 being carried by a bracket 85 which in turn is mounted on the upper end of a post 86 which receives rotative movement from the conventional tone arm actuator unit 25.

The present invention provides, in combination with the tone arm 81, a supporting harness for the stop pin 14 comprising a finger 87 of resilient ribbon metal having a rear end anchored to the bracket 85, having an intermediate portion embraced within the intermediate portion of arm 81, between the side flanges thereof, with a slight amount of lateral clearance, and having the stop pin 14 securely anchored rigidly to its forward end and projecting downwardly. A yoke of inverted U-shape has respective parallel side arms 88 secured at their lower ends to their respective side margins of finger 87 and integrally joined at their upper ends by a cross web 89 and which normally rests upon the arm 81 to suspend the forward end of finger 87. The lateral spacing of arms 88 is somewhat greater than the width between the outer faces of the side flanges of arm 81, whereby a small amount of lost motion for lateral shifting of the pin 14 with reference to the stylus 84, is provided.

When stylus 84 is travelling in the record groove, pin 14 will project downwardly past the plane of stop sector 63 for successive engagement with the stop teeth 13 thereof. As the free end of arm 81 is gradually drawn toward the center of the record by the stylus 84 following the record groove, the stop pin 14 will correspondingly be shifted toward the point of the tooth 13 with which it is in engagement, until finally the point of the engaged tooth 13 will pass the cross sectional center of pin 14 and commence to develop a camming action under the light yielding rotative drive being imparted to the carriage D by the rotating record, and at the point where this camming action becomes effective to displace the pin 14 toward the center of the record, the finger 87 (which up to this point will have been biased away from the center of the record by the frictional drag of pin 14 against its contacting tooth 13) will suddenly be nudged toward the center of the record by the point of tooth 13, swinging transversely with respect to arm 81 to the extent of the lost motion permitted by yoke arms 88. This lost motion shifting movement is sufficient to allow the pin 14 to completely clear the point of its contacting tooth 13 without pushing the arm 81 toward the center of the record, and thus there is a complete avoidance of any tendency to force the stylus 84 out of the groove it is following.

As the stop pin 14 clears the point of the tooth 13 against which it has been engaged, the carriage D will momentarily be freed for rotative movement in response to the light frictional drive received from the record, and will therefore perform an indexing movement which is arrested by the engagement of the stop pin 14 against the next tooth 13. This indexing movement will shift the transparency strip circumferentially the distance between adjacent transparencies 12 so as to shift a new transparency astride the light beam of projector G.

When the stylus reaches the end of the record groove, the stop pin 14 will correspondingly reach the terminal shoulder 13', from which it will be shifted into the slot 69 as the stylus travels on the final turns of the record, and as the lower end of the stop pin 14 (which is conical) meets the end of slot 69 it will be cammed upwardly into the return guide groove 70 in which it will follow to swing the tone arm unit E outwardly from the center of the record toward a starting position. In this operation, a tone arm will be lifted slightly so as to lift the stylus out of the record groove for the return movement. At the end of the return movement, the stop pin 84 will drop into the slot 71, in a position to engage the first stop tooth 13 as the record and carriage continues to revolve. As the first tooth 13 engages the stop pin, the rotative movement of the carriage D will be arrested for the beginning of another cycle of operation.

*Transparency band F.*—Transparency band F consists in a flexible strip of laminated material including a series of thin transparencies 12 of film material in a row, laminated between opposed strips of paper 90 as shown in FIG. 4*a*. Strips 90 are cut on an arcuate contour and formed (during adhesive attachment of the paper framing strips to one another and to the margins of transparencies 12) into frusto-conical form, with its upper edge having a larger diameter than its lower edge, with a relatively wide margin below the row of transparencies 12, and with a relatively narrow margin above. The inward lower margin of the band F is adapted to rest in the corner between the rim flange 67 (which provides a support for the band) and the vertical rim shoulder 68. From this corner, the band flares upwardly so that each transparency is tilted upwardly and outwardly. The angle of tilt is such that the axis of the beam projected by projector G will be normal to the plane of the transparency that is presented to the beam. In the ends of band F are longitudinal slots 90' which receive the latch lever 76 and hook 79.

*Projector G.*—Projector G comprises a housing 91 containing a conventional light source such as a high powered filament bulb, a light beam outlet 92 with a condensing lens, disposed outwardly of the transparency strip F, and a focusing lens unit 93 supported by a bracket 94 immediately inwardly of the transparency strip F. The bracket 94 is mounted upon the upper base panel 18 just outwardly of carriage rim flange 67 and the light housing 91 is mounted in an opening of the panel 18 as shown. The lens elements 92 and 93 are arranged on a common axis which intersects the registered transparency 12 normal to the plane thereof and extends over the center of the turntable to the center of the screen 46, the lower area of the light beam just clearing the hub 58 and tone arm assembly E.

*Carriage stabilizing unit—FIG. 4.*—To stabilize the carriage 49 against vertical vibration in the area of projector G (which would cause vertical oscillation of the picture image on the screen) the invention provides, in its modified form shown in FIG. 5, a pair of idler rollers 96 mounted on L-brackets 97 secured to the upper base panel 18 at respective sides of the light housing 91 of projector G. The rollers 96 extend over and engage the rim flange 67 of the carriage body 55. A matching pair of rollers are mounted to engage the underside of flange 67.

*Carriage stabilizing unit—Preferred form—FIGS. 2–3.*—As an alternative structure, especially desirable in installations where the upper housing structure is removed and the image projected to a considerable distance so as to enlarge the image on a relatively large screen, the stabilizer mechanism preferably utilizes hold down magnets 98 (FIGS. 3 and 2*b*) cooperating with the underside of the rim 67 (of ferrous metal) and energized when the carriage is stopped at one of its indexed positions. During the indexing movement, the magnets 98 are de-energized so as to free the carriage for the indexing movement. Magnets 98 are mounted in suitable bracket means 100 attached to the underside of upper base panel 18, with the pole pieces of the magnets projecting upwardly through the panel 18 as shown in FIG. 2*b*.

Magnets 98 are automatically de-energized to release the carriage D for indexing movements, and at the end of each indexing movement, they are re-energized to clamp the carriage in a fixed position, stabilizing the projected beam on an axis which is the same for each picture, and eliminating flutter of the picture on the screen.

Referring now to FIGS. 2 and 2*a*, the carrier body 55*a* of FIG. 2 is equivalent in construction to that shown in FIG. 4, and the corresponding parts thereof are referred to by corresponding reference numerals. The carriage D' of FIGS. 2 and 2*a* differs from the modified carrier of FIG. 4 in that it is provided with an arcuate insulator strip 105 substantially covering the upper face of the stop bar 63*a* and having teeth 106 which cover the stop teeth 13*a* of stop bar 63*a* with the exception of the radial stop shoulders 107, which are exposed for engagement by the follower pin 14 of tone arm unit E to complete a step of indexing movement of the carriage. A segment of each stop tooth 13*a* projects circumferentially beyond the approximately radial shoulder 108 of the respective tooth 106 of insulator strip 105, except at the point of insulator tooth 106 at the outer extremity of shoulder 108, where the latter intersects the stop shoulder 107 of the respective stop tooth 13*a* and has its point projecting slightly beyond the respective corner of stop tooth 13*a* so as to provide the departure point from which the follower pin 14 is released for the next indexing movement of the carriage.

The carriage body 55*a* is of suitably conductive metal, which is also magnetic, such as sheet iron, so that it may function both as an intermittent contact device and as a magnetic armature for engagement by magnets 98, or equivalent, and the exposed stop shoulder 107 of each stop tooth 13*a* functions as a contact to establish a circuit from carriage D' through a conductor 109 to the respective magnets 98 (connected in parallel), the magnet 98 being connected to a suitable current source (e.g. the 110 volt supply circuit) indicated at 110, and thus being energized each time the ground connection is established through stop pin 14, connected to ground *g* by a suitable ground connection 111.

Just prior to being moved past the release point of insulator tooth 106, the stop pin 14 will separate from its engagement with contact shoulder 107, thus breaking the circuits to the magnets 98 and releasing the carrier D' for the indexing movement which will take place upon release of the stop pin from the point of the tooth 106.

The peripheral margin 112 of tooth 106 projects outwardly over a recess 113 which extends from the back side of each stop tooth 13*a* to the shoulder 107 of the next stop tooth. Thus the margin 112 provides a bearing surface against which the stop pin will slide until engaged by the next stop shoulder 107, maintaining the magnet circuit in the de-energized condition until the pin engages the contact shoulder 107. Thus the carriage is automatically clamped in a steady, fixed condition for the projection of each picture, this clamped condition maintaining throughout the radially inward movement of the follower pin 14 against contact shoulder 107 until it reaches the point of release for the next indexing movement. The steadying of the carriage in a fixed position is effected by the magnetic clamping of its marginal rim 67 against the pole pieces of magnet 98. Normally, a very slight clearance exists between the rim 67 and the pole pieces so as to avoid drag of the rim 67 against the magnets during indexing movements. There is sufficient flexibility in the carriage body 55*a*, however, to permit the rim 67 to be drawn downwardly the slight distance required to close the gap between itself and the magnet pole pieces so as to effect the clamping movement.

I claim:

1. In a combined sound reproducer and slide projector: a base; a turntable thereon for rotating a disc record having a spiral record groove; an indexing carriage having means for supporting the same on said record and for receiving frictional drive therefrom, said carriage including a sector having internal stop teeth spirally arranged successively closer to the rotational axis of the turntable; a tone arm movable above said carriage, said tone arm having a stylus for following said groove and a stop pin for engagement successively with said stop teeth and releasable therefrom in succession by radially inward movement responsive to the following of said groove by said stylus so as to free said carriage for indexing movements each of which is arrested by engagement of a succeeding tooth against the stop pin; said carriage having means for attaching thereto an arcuate strip having a row of transparencies therein; a projector mounted on said base for producing a light beam which is successively registered with the respective transparencies by the indexing movements of said carriage; and means providing a lost-motion driving connection between said tone arm and said stop pin such that in escaping from a stop tooth said stop pin may shift toward the rotational axis in response to camming action of the pin against the point of the tooth without transmitting through the tone arm, any radial force such as would tend to dislodge said stylus from said groove.

2. In a combined sound reproducer and slide projector: a base; a turntable thereon for rotating a disc record; an indexing carriage having means for supporting the same on said record and for receiving frictional drive therefrom; a tone arm movable above said carriage, said carriage and tone arm having stop means successively interengageable to hold said carriage stationary and releasable by radially inward movement of said tone arm so as to intermittently free said carriage for indexing movements; a transparency frame in the form of a frusto-conical strip having a plurality of picture transparencies in a row therein; means for mounting said strip on the periphery of said carriage in an upwardly flaring position with each transparency tilted outwardly; and a projector mounted on said base in a tilted position such as to project a light beam upwardly across the turntable through successive transparencies.

3. Apparatus as defined in claim 2, including an upper housing mounted on said base, a mirror on a back wall of said upper housing, diametrically opposite said projector across said carriage; and a translucent screen in a front wall of said upper housing, adjacent said projector, in a position to receive the reflection from said mirror.

4. In a combined sound reproducer and slide projector: a base; a turntable thereon for rotating a disc record; an indexing carriage having means for supporting the same on said record and for receiving frictional drive therefrom; a tone arm movable above said carriage, said carriage and tone arm having stop means successively interengageable to hold said carriage stationary and releasable by radially inward movement of said tone arm so as to intermittently free said carriage for indexing movements; a transparency frame comprising a strip-form sandwich structure of front and back paper strips and a plurality of picture transparencies laminated between said strips, said frame having longitudinal slots in its respective ends; and said carriage having a rim flange and an axially offset rim shoulder extending downwardly from the body of the carriage and joining said rim flange thereto; and a pair of securing elements mounted on the carriage body, extending radially outwardly past said rim shoulder and over said rim flange, and receivable in said slots to secure the ends of said transparency frame with the lower margin of the frame resting on said rim flange and with the frame supported against said rim shoulder.

5. Apparatus as defined in claim 4, wherein said securing elements are of thin, flat form, disposed in a plane parallel to and immediately above the body of said carriage, one of said securing elements consisting in a latch pivoted to said carriage body on a vertical pivot for horizontal swinging movement and the other being a fixed hook.

6. Apparatus as defined in claim 4, including a thin flat hold-down finger secured to said carriage body, extending over said rim flange, and received in a slot in an intermediate portion of said strip.

7. In a combined sound reproducer and slide projector: a base; a turntable thereon for rotating a disc record having a spiral record groove; an indexing carriage having means for supporting the same on said record and for receiving frictional drive therefrom, said carriage including a sector having internal stop teeth spirally arranged successively closer to the rotational axis of the turntable; a tone arm movable above said carriage, said tone arm having a stylus for following said groove and a stop pin for engagement successively with said stop teeth and releasable therefrom in succession by radially inward movement responsive to the following of said groove by said stylus so as to free said carriage for indexing movements each of which is arrested by engagement of a succeeding tooth against the stop pin; said carriage having means for supporting a plurality of picture transparencies in a series extending circumferentially about its periphery; a projector mounted on said base for producing a light beam which is successively registered with the respective transparencies by the indexing movements of said carriage; and means providing a lost-motion driving connection between said tone arm and said stop pin such that in escaping from a stop tooth said stop pin may shift toward the rotational axis in response to camming action of the pin against the point of the tooth without transmitting through the tone arm, any radial force such as would tend to dislodge said stylus from said groove.

8. In a combined sound reproducer and slide projector: a base; a turntable thereon for rotating a disc record having a spiral record groove; an indexing carriage having means for supporting the same on said record and for receiving frictional drive therefrom, said carriage including a sector having internal stop teeth spirally arranged successively closer to the rotational axis of the turntable; a tone arm movable above said carriage, said tone arm having a stylus for following said groove and a stop pin for engagement successively with said stop teeth and releasable therefrom in succession by radially inward movement responsive to the following of said groove by said stylus so as to free said carriage for indexing movements each of which is arrested by engagement of a succeeding tooth against the stop pin; said carriage having means for supporting a plurality of picture transparencies in a series extending circumferentially about its periphery; a projector mounted on said base for producing a light beam which is successively registered with the respective transparencies by the indexing movements of said carriage; and means providing a lost-motion driving connection between said tone arm and said stop pin, comprising an elongated finger having a free end to which said stop pin is secured in downwardly projecting position, said finger extending longitudinally beneath said tone arm and attached thereto at its opposite end, and a yoke including side arms secured to said finger and projecting upwardly therefrom in embracing relation to said tone arm with lateral clearance permitting lost-motion transverse shifting movement of said finger and stop pin relative to said tone arm such that in escaping from a stop tooth said stop pin may shift toward the rotational axis in response to camming action of the pin against the point of the tooth without transmitting through the tone arm, any radial force such as would tend to dislodge said stylus from said groove.

9. Apparatus as defined in claim 8, wherein said finger is of resilient ribbon metal and is disposed with its intermediate portion in a horizontal plane for vertical flexing movement thereof, and wherein said yoke includes a bridge bar integrally joining the upper ends of its said arms, permitting upward shifting of said stop pin and the free end of said finger, and engageable with said tone arm to limit downward movement of said stop pin relative to the tone arm.

10. In a combined sound reproducer and slide projector: a base; a turntable thereon for rotating a disc record; an indexing carriage having means for supporting the same on said record and for receiving yielding frictional drive therefrom, said carriage including a sector having internal stop teeth spirally arranged successively closer to the rotational axis of the turntable; a tone arm movable above said carriage, said tone arm having a record-following stylus and a stop pin for engagement successively with said stop teeth and releasable therefrom in succession by radially inward movement so as to free said carriage for indexing movements, each of which is arrested by engagement of a succeeding tooth against the stop pin; said carriage having means for supporting an arcuate series of picture transparencies around the rim thereof; a projector mounted on said base for producing a light beam which is successively registered with the respective transparencies by the indexing movements of said carriage; said carriage having a flat radial rim; and carriage stabilizing means cooperating with said rim for steadying the carriage during a state of picture projection said stabilizing means comprising electromagnets disposed on respective sides of said projector and having pole pieces in close association with said carriage rim, the latter being of magnetic material so as to be clamped by said pole pieces when the electromagnets are energized; and automatic control including an electric circuit for energizing said electromagnets and combined stop and contact means carried by said carriage and automatically operable upon arrival of the carriage at a projection position stopped by engagement of said stop pin with one of said stop teeth, to energize said electromagnets and automatically operable to de-energize said electromagnet during indexing movements of the carriage.

11. Apparatus as defined in claim 10, wherein said automatic control means comprises combined stop shoulders and electrical contacts in said stop teeth, and insulator means providing peripheral margins of said stop teeth along which said stop pin will be guided and held electrically disconnected from said electric circuit during indexing movements.

12. Apparatus as defined in claim 4, including stabilizing means comprising pairs of rollers disposed in circumferentially spaced relation on respective sides of the projector, the rollers of each pair being in vertically opposed relation engaging upper and lower sides of said carriage rim flange respectively.

13. In a combined sound reproducer and slide projector: a base; a turntable thereon for rotating a disc record; an indexing carriage having means for supporting the same on said record and for receiving frictional drive therefrom; a tone arm movable above said carriage, said carriage and tone arm having stop means successively interengageable to hold said carriage stationary and releasable by radially inward movement of said tone arm so as to intermittently free said carriage for indexing movements; a transparency frame in the form of a frusto-conical strip having a plurality of picture transparencies in a row therein, and having slots in its respective ends; means for mounting said strip on the periphery of said carriage in an upwardly-flaring position, with each transparency tilted outwardly, said mounting means comprising a hook on said carriage receivable in one of said slots and a latch lever pivoted to said carriage and receivable in the other slot; and a projector mounted on said base in a tilted position such as to project a light beam upwardly across the turntable through successive transparencies.

References Cited in the file of this patent

UNITED STATES PATENTS

| | | |
|---|---|---|
| 1,173,501 | Geer | Feb. 29, 1916 |
| 1,584,708 | Pemberton-Billing | May 11, 1926 |
| 2,272,622 | Rundle | Feb. 10, 1942 |
| 2,818,772 | Greenaway | Jan. 7, 1958 |
| 2,869,420 | Thannhauser | Jan. 20, 1959 |
| 2,936,180 | Wennerbo | May 10, 1960 |